United States Patent
Carr et al.

(10) Patent No.: US 7,346,184 B1
(45) Date of Patent: Mar. 18, 2008

(54) PROCESSING METHODS COMBINING MULTIPLE FRAMES OF IMAGE DATA

(75) Inventors: J. Scott Carr, Tualatin, OR (US); Brett Alan Bradley, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 09/563,663

(22) Filed: May 2, 2000

(51) Int. Cl.
*G06K 9/00* (2006.01)
(52) U.S. Cl. .................................. 382/100
(58) Field of Classification Search ............... 382/100, 382/232, 284; 380/51
See application file for complete search history.

(56) References Cited

U.S. PATENT DOCUMENTS

| | | | |
|---|---|---|---|
| 3,805,238 A | 4/1974 | Rothfjell | |
| 4,396,903 A * | 8/1983 | Habicht et al. | 382/103 |
| 4,590,366 A | 5/1986 | Rothfjell | |
| 4,675,746 A | 6/1987 | Tetrick et al. | |
| 4,689,477 A | 8/1987 | Goldman | |
| 4,876,617 A | 10/1989 | Best et al. | |
| 4,949,391 A * | 8/1990 | Faulkerson et al. | 382/313 |
| 4,972,476 A | 11/1990 | Nathans | |
| 4,993,068 A | 2/1991 | Piosenka | |
| 5,079,648 A | 1/1992 | Maufe | |
| 5,237,164 A | 8/1993 | Takada | 235/487 |
| 5,262,860 A | 11/1993 | Fitzpatrick et al. | |
| 5,284,364 A | 2/1994 | Jain | 283/87 |
| 5,319,453 A | 6/1994 | Copriza | |
| 5,337,361 A * | 8/1994 | Wang et al. | 380/51 |
| 5,354,097 A * | 10/1994 | Tel | 283/72 |
| 5,379,345 A | 1/1995 | Greenburg | |
| 5,384,846 A | 1/1995 | Berson | |
| 5,434,403 A | 7/1995 | Amir et al. | |
| 5,436,970 A | 7/1995 | Ray et al. | |
| 5,438,188 A * | 8/1995 | Surka | 235/462.07 |
| 5,446,273 A | 8/1995 | Leslie | |
| 5,457,308 A * | 10/1995 | Spitz et al. | 235/462.12 |
| 5,469,506 A | 11/1995 | Berson | |

(Continued)

FOREIGN PATENT DOCUMENTS

EP 629972 12/1994

(Continued)

OTHER PUBLICATIONS

Chow et al, "Forgery and Tamper-Proof Identification Document," IEEE Proc. 1993 Int. Carnahan Conf. on Security Technology, 35-15 Oct., 1993, pp. 11-14 (copy in 51475).

(Continued)

*Primary Examiner*—Matthew C. Bella
*Assistant Examiner*—Tom Y. Lu

(57) ABSTRACT

A document authentication station, for use with passports or the like, includes a 2D image sensor (e.g., CCD- or CMOS-based video camera), and a computer device. The image sensor produces produce image data corresponding to a presented document. From this image data, the computer extracts two or more identification data. One is a digital watermark. The other can be a bar code, data glyphs, OCR data, etc. The processor then proceeds to check that the two identification data correspond in an expected fashion. If not, the document is flagged as suspect or fake. Reliability of detection may be enhanced by processing plural frames of data from the image sensor before issuing a result.

16 Claims, 1 Drawing Sheet

U.S. PATENT DOCUMENTS

| | | | |
|---|---|---|---|
| 5,471,533 A | 11/1995 | Wang | |
| 5,485,554 A | 1/1996 | Lowitz et al. | |
| 5,490,217 A | 2/1996 | Wang et al. | |
| 5,499,294 A | 3/1996 | Friedman | |
| 5,509,083 A | 4/1996 | Abtahi et al. | |
| 5,513,264 A * | 4/1996 | Wang et al. | 380/51 |
| 5,625,720 A * | 4/1997 | Miyaza et al. | 382/284 |
| 5,636,292 A | 6/1997 | Rhoads | |
| 5,646,997 A | 7/1997 | Barton | |
| 5,652,626 A | 7/1997 | Kawakami | |
| 5,659,726 A | 8/1997 | Sandford | |
| 5,664,018 A | 9/1997 | Leighton | |
| 5,682,030 A | 10/1997 | Kubon | |
| 5,694,471 A | 12/1997 | Chen et al. | 380/25 |
| 5,708,717 A * | 1/1998 | Alasia | 380/51 |
| 5,721,788 A | 2/1998 | Powell | |
| 5,748,783 A | 5/1998 | Rhoads | |
| 5,760,386 A | 6/1998 | Ward | |
| 5,767,987 A | 6/1998 | Wolff et al. | |
| 5,768,426 A | 6/1998 | Rhoads | |
| 5,787,186 A | 7/1998 | Schroeder | |
| 5,799,092 A | 8/1998 | Kristol et al. | |
| 5,811,779 A | 9/1998 | Gaylord, Jr. et al. | |
| 5,822,436 A | 10/1998 | Rhoads | |
| 5,832,119 A | 11/1998 | Rhoads | |
| 5,841,886 A | 11/1998 | Rhoads | |
| 5,850,481 A | 12/1998 | Rhoads | |
| 5,859,920 A | 1/1999 | Daly et al. | |
| 5,862,260 A | 1/1999 | Rhoads | |
| 5,864,622 A | 1/1999 | Marcus | 380/23 |
| 5,864,623 A | 1/1999 | Messina et al. | |
| 5,890,742 A | 4/1999 | Waller | |
| 5,907,149 A | 5/1999 | Marckini | |
| 5,912,934 A * | 6/1999 | Acks et al. | 376/248 |
| 5,912,974 A | 6/1999 | Holloway et al. | |
| 5,949,885 A | 9/1999 | Leighton | |
| 5,995,105 A | 11/1999 | Reber et al. | |
| 5,995,625 A | 11/1999 | Sudia et al. | |
| 6,000,612 A | 12/1999 | Xu | |
| 6,024,287 A | 2/2000 | Takai et al. | 235/493 |
| 6,031,914 A | 2/2000 | Tewfik et al. | |
| 6,086,707 A | 7/2000 | Waller | |
| 6,088,612 A * | 7/2000 | Blair | 600/407 |
| 6,095,566 A | 8/2000 | Yamamoto | |
| 6,122,403 A | 9/2000 | Rhoads | |
| 6,185,312 B1 | 2/2001 | Nakamura et al. | |
| 6,185,316 B1 | 2/2001 | Buffam | |
| 6,208,765 B1 | 3/2001 | Bergen | |
| 6,226,387 B1 | 5/2001 | Tewfik et al. | |
| 6,233,684 B1 * | 5/2001 | Stefik et al. | 713/176 |
| 6,240,219 B1 | 5/2001 | Gregory | |
| 6,243,480 B1 * | 6/2001 | Zhao et al. | 382/100 |
| 6,277,067 B1 | 8/2001 | Blair | |
| 6,289,108 B1 | 9/2001 | Rhoads | 382/100 |
| 6,292,092 B1 | 9/2001 | Chow | |
| 6,307,949 B1 | 10/2001 | Rhoads | |
| 6,311,214 B1 | 10/2001 | Rhoads | |
| 6,332,693 B1 | 12/2001 | Dove et al. | |
| 6,343,138 B1 | 1/2002 | Rhoads | 382/100 |
| 6,369,904 B1 | 4/2002 | Bhattacharjya et al. | |
| 6,385,329 B1 | 5/2002 | Sharma et al. | |
| 6,394,352 B1 * | 5/2002 | De Renzis | 235/462.12 |
| 6,411,392 B1 | 6/2002 | Bender et al. | |
| 6,463,416 B1 | 10/2002 | Messina | |
| 6,466,253 B1 | 10/2002 | Honjoh | |
| 6,466,618 B1 | 10/2002 | Messing et al. | |
| 6,493,469 B1 * | 12/2002 | Taylor et al. | 382/284 |
| 6,496,933 B1 | 12/2002 | Nunally | |
| 6,535,617 B1 | 3/2003 | Hannigan et al. | |
| 6,553,127 B1 | 4/2003 | Kurowski | |
| 6,570,613 B1 | 5/2003 | Howell | |
| 6,590,996 B1 | 7/2003 | Reed et al. | |
| 6,594,403 B1 * | 7/2003 | Bozdagi et al. | 382/284 |
| 6,614,914 B1 * | 9/2003 | Rhoads et al. | 382/100 |
| 6,621,524 B1 | 9/2003 | Iijima et al. | |
| 6,625,297 B1 | 9/2003 | Bradley | |
| 6,636,551 B1 | 10/2003 | Ikeda et al. | |
| 6,665,454 B1 | 12/2003 | Silverbrook et al. | |
| 6,683,966 B1 | 1/2004 | Tian et al. | |
| 6,843,566 B2 | 1/2005 | Mihara | |
| 6,862,054 B2 | 3/2005 | Kawakami | |
| 6,971,011 B1 | 11/2005 | Maes | |
| 7,158,099 B1 | 1/2007 | Berube et al. | |
| 2001/0007975 A1 | 7/2001 | Nyberg, Jr. et al. | |
| 2002/0041761 A1 | 4/2002 | Glotzbach et al. | |
| 2002/0048282 A1 | 4/2002 | Kawamae et al. | |
| 2002/0059880 A1 | 5/2002 | Klinefelter et al. | |
| 2002/0090110 A1 | 7/2002 | Braudaway et al. | |
| 2002/0136429 A1 | 9/2002 | Stach et al. | |
| 2003/0025814 A1 | 2/2003 | Hunter et al. | |
| 2003/0071905 A1 | 4/2003 | Yamasaki | |
| 2004/0008866 A1 | 1/2004 | Rhoads et al. | |

FOREIGN PATENT DOCUMENTS

| | | |
|---|---|---|
| EP | 642060 | 3/1995 |
| EP | 650146 | 4/1995 |
| EP | 0 730 242 | 9/1996 |
| JP | 3-185585 | 8/1991 |
| WO | WO95/13597 | 5/1995 |
| WO | WO9603286 | 2/1996 |
| WO | WO96/26494 | 8/1996 |
| WO | WO96/36163 | 11/1996 |
| WO | WO98/43152 | 10/1998 |
| WO | WO 99/13391 * | 3/1999 |
| WO | WO99/36876 | 7/1999 |
| WO | WO0139106 | 5/2001 |
| WO | WO0141056 | 6/2001 |

OTHER PUBLICATIONS

Kawaguchi et al, "Principle and Applications of BPCS Steganography," Proc. SPIE vol. 3528, Multimedia Systems and Applications, Nov. 2-4, 1998, pp. 464-473.

Komatsu et al, "A Proposal on Digital Watermarking om Document Image Communication and Its Application to Realizing a Signature," Electronics and Communications in Japan, Part 1, vol. 73, No. 5, 1990, pp. 22-33.

Komatsu et al, "Authentication System Using Concealed Image in Telematics," Memoirs of the School of Science and Engineering, Wasdea Univ., No. 52, 1988, pp. 45-60.

Szepanski, "A Signal Theoretic Method for Creating Forgery-Proof Documents for Automatic Verification," Proc. of the 1979 Carnahan Conf. on Crime Countermeasures, May 16-18, 1979, pp. 101-109.

Anand, D,. and Niranjan U. C., "Watermarking Medical Images with Patient Information", IEEE, Oct. 29, 1998.

Pankanti, S. et al. "Verification Watermarks on Fingerprint Recognition and Retrieval", IS&T/SPIE Conference on Security and Watermarking of Multimedia, Oct. 2000, pp. 66-78.

Perry, B. et al. "Digital Watermarks as a Security Feature for Identity Documents", Proceedings of SPIE, vol. 3973, Apr. 2000, pp. 80-87.

Ratha, N. et al. "Secure Data Hiding in Wavelet Compressed Fingerprint Images", ACM Multimedia 2000 Workshop, Oct. 30, 2000, pp. 127-130.

Alattar, "'Smart Images' Using Digimarc's Watermarking Technology," SPIE 12th Int'l Symposium on Electronic Imaging, Vo. 3971, No. 25, pp. 1-10, Jan. 2000.

Dautzenburg, "Watermarking Images," Department of Microelectronics and Electrical Engineering, Trinity College, Dublin, Oct. 1994, 58pp.

IBM DataHiding Proposal, Version 1.0, Sep. 1997, 32pp.

Linnartz et al, "Philips Electronics Response to Call for Proposals Issued by the Data Hiding SubGroup, Copy Protection Technical Working Group," Sep. 1997, 32pp.

Sony Corporation, "Response for Copyright Protection System Using Watermark Technology," Sep. 1997, 15pp.

Elad et al, "Restoration of a Single Superresolution Image from Several Blurred, Noisy, and Undersampled Measured Images," IEEE Trans. On Image Processing, vol. 6, No. 12, Dec. 1997, pp. 1646-1658.

Eren et al, "Robust, Object-Based High-Resolution Image Reconstruction From Low-Resolution Video," IEEE Trans. on Image Processing, vol. 6, No. 10, Oct. 1997, pp. 1446-1451.

Schultz et al, "Extraction of High-Resolution Frames from Video Sequences," IEEE Trans. on Image Processing, 5(6), pp. 996-1011, 1996.

IBM DataHiding Proposal, Version 1.0, Sep. 1997.

Sony, Response for Copyright Protection System Using Watermark Technology, Sep. 1997.

Philips Electronics Response to Call for Proposals Issued by the Data Hiding SubGroup, Copy Protection Technical Working Group, Sep. 1997.

Response to the Data Hiding System/Video Watermark Call for Proposals Issued by the Data Hiding SubGroup of the Copy Protection Technical Working Group, submitted jointly by Macrovision Corporation and Digimarc Corporation, Sep. 1997.

* cited by examiner

PROCESSING METHODS COMBINING MULTIPLE FRAMES OF IMAGE DATA

RELATED APPLICATION DATA

The subject matter of the present application is related to that disclosed in application Ser. Nos. 09/127,502, filed Jul. 31, 1998 (now U.S. Pat. No. 6,345,104); 09/074,034, filed May 6, 1998 (now U.S. Pat. No. 6,449,377); 09/343,104, filed Jun. 29, 1999; 09/503,881, filed Feb. 14, 2000; and 09/547,664, filed Apr. 12, 2000; 09/562,516, filed May 1, 2000; 09/562,049, filed May 1, 2000; and 09/562,524, filed May 1, 2000, and in U.S. Pat. Nos. 5,841,886 and 5,862,260.

TECHNICAL FIELD OF THE INVENTION

The present technology concerns techniques in which data from multiple image frames are combined into a composite image, allowing subsequent image processing to yield more reliable results. The technology is particularly detailed in the context of document authentication methods.

BACKGROUND AND SUMMARY OF THE INVENTION

Digital watermarking technology, a form of steganography, encompasses a great variety of techniques by which plural bits of digital data are hidden in some other object without leaving human-apparent evidence of alteration. Many such techniques are detailed in the cited documents.

In U.S. Pat. No. 5,841,886, the present assignee disclosed an identity card that includes digitally watermarked data, e.g., hidden in a photograph of a person depicted on the card. The '886 patent noted that a passport inspector, or the like, could compare the data resulting from decoding of the watermark with other data derived from the card (e.g., text printing, bar codes, etc.). If the data did not match, then photo-swapping or other alteration of the card could be inferred.

In accordance with one aspect of the present invention, the arrangement in the '886 patent is improved upon by providing an authentication station that includes a 2D image sensor (e.g., CCD- or CMOS-based video camera), and a computer device. The image sensor produces image data corresponding to the presented document. From this image data, the computer extracts two or more identification data. One is a digital watermark. The other can be represented in the form of a bar code, data glyphs, OCR data, etc. The processor then proceeds to check that the two identification data correspond in an expected fashion. If not, the document is flagged as suspect or fake.

In accordance with another aspect of the invention, detection of barcode, data glyphs, OCR printing, and the like is enhanced by processing plural frames of image data obtained by the image sensor.

The foregoing and other features and advantages of the present invention will be more readily apparent from the following detailed description, which proceeds with reference to the accompanying drawings.

DETAILED DESCRIPTION

Figure 1:
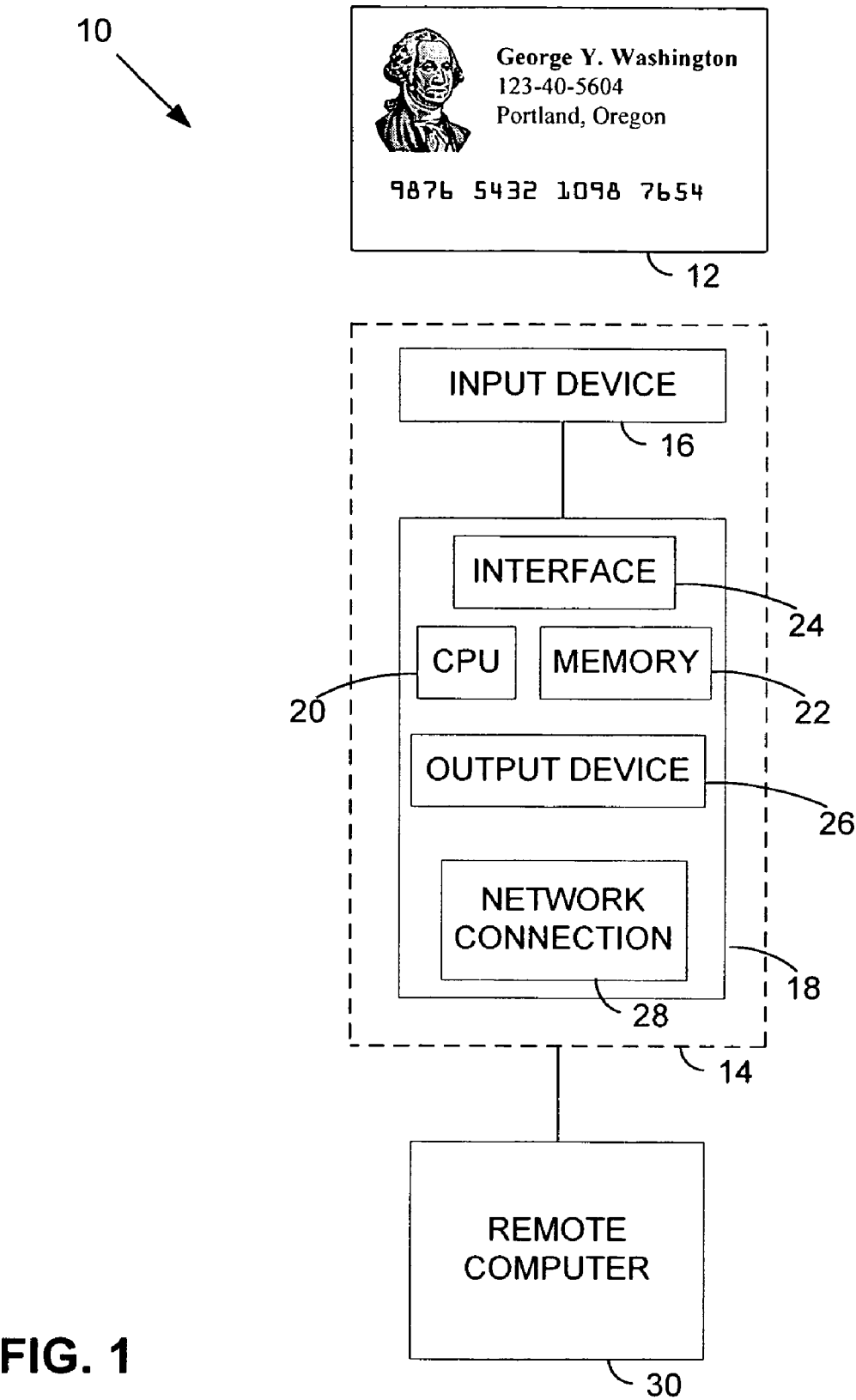
FIG. 1 shows a system according to an illustrative embodiment of the present invention.

In accordance with one embodiment 10 of the present invention, a document 12 includes plural-bit digital data steganographically encoded therein (e.g., by digital watermarking). The document can take any form; the following discussion particularly considers photo IDs, such as passports and drivers' licenses.

The encoding of the document can encompass artwork or printing on the document, the document's background, a laminate layer applied to the document, surface texture, etc. If a photograph is present, it too can be encoded. A variety of watermark encoding techniques are detailed in the cited patents and applications; many more are known to artisans in the field.

In an illustrative embodiment, the card is encoded with a payload of 32 bits. This payload is processed before encoding, using known techniques (e.g., convolutional coding, turbo codes, etc.), to improve its reliable detection in adverse conditions. In other embodiments, a payload larger or smaller than 32 bits can naturally be used (e.g., 8-256 bits).

The encoded card is presented to a reader station 14 for reading. The reader station includes an input device 16 and a processor 18.

The illustrated input device 16 is a video camera, including an image sensor comprising plural rows and columns of image sensing elements. Popular video cameras presently employ CCD or CMOS image sensors, but other technologies can likewise be employed.

The processor 18 can be a general purpose or dedicated computer, incorporating a CPU 20, memory 22, an interface 24 to the input device, a display screen or other output device 26, and optionally a network connection 28. The network connection can be used to connect, through an intranet, the internet, or otherwise, to a remote computer 30.

Suitable software programming instructions, stored in memory 22 of processor 18, or in a memory of remote computer 30, can be used to effect various types of functionality for embodiment 10.

In one embodiment, image data obtained by the camera 16 is stored in the memory of the processor 18. There it is analyzed to decode plural bits of steganographically encoded watermark data. Additionally, the frame of image data is processed to extract a second type of identification data. The second type of identification data may be encoded in bar code, data glyph, or OCR form.

Once the processor has obtained both data, the two are cross-checked to determine whether they correspond in the expect manner. This checking can take many different forms, depending on the application.

In one application, the watermark conveys textual information that is encoded in the second identification data, e.g., a bearer's name, a passport number, a social security number, etc. In such case, the processor checks that the information represented by the decoded bar code/data glyph/OCR matches the information represented by the watermark. If they do not match, the document is flagged as a likely forgery.

In another application, the watermark conveys a unique identifier (UID), or an index number. With this number, the processor 18 can query a database, e.g., resident on the remote computer 30, for additional information. In an illustrative case, the UID may be a passport number. The remote database may have a record corresponding to each valid passport number. In response to the query, the database may return some or all of the record data to the station 14. The returned data (e.g., bearer's name, or social security number) can be compared with counterpart information represented in barcode/data glyph/OCR form. Again, if they do not match, the document is flagged as a likely forgery. (The database may also return data that is used by a human inspector. For example, the database may provide a reference photograph image of the ID document holder, which the inspector can compare with the person presenting the ID document.)

In other applications, the data represented by the watermark or the other indicia is processed in some manner prior to comparison. For example, the watermark may encode a 16 bit hash value derived from the bearer's name or passport number. This latter data is represented in barcode/data glyph/OCR form. To determine document authenticity, the station 14 decodes this latter data from the image data, hashes it, and compares the resulting data with the 16 bit watermark data. If they do not match, the document is again flagged as a likely forgery.

In accordance with another aspect of the present invention, plural frames of image data from the camera 16 are employed in detecting the watermark data, the other data (i.e. barcode/glyph/OCR), or both. This can be effected in various ways.

To illustrate, consider the watermark data. In the watermarking technology detailed in cited application Ser. No. 09/503,881, the document is encoded both with unknown payload bits and also with known reference bits. Only if the reference bits are detected with a suitable degree of confidence are the payload bits taken as trustworthy. If, on examining a first frame of image data, the reference bits are not detected with sufficient confidence, the entire frame can be discarded, and a subsequent frame can be processed instead. Or, the results from the first frame can be accumulated with results from second or succeeding frames. The reference bits in the accumulated results are tested after each frame to determine whether they exhibit the requisite degree of trustworthiness. Accumulation continues until this test is met. The payload bits are then interpreted to yield the watermark payload.

Instead of accumulating watermark results over time, another approach is to accumulate the watermark results over space. In such an arrangement, a first frame of image data may have one portion that gives reliable watermark data, and a second portion that is unreliable (e.g., due to glare from the imaged object, positioning of the object partially out of the focal zone of the imaging device, etc.). In such case, second portion data from second or succeeding image frames can checked and used to augment the usable data from the first image frame until a sufficiently large patchwork of data is assembled for reliable watermark decoding.

Counterparts to these accumulate-over-time and accumulate-over-space approaches can likewise be used with the imaged barcode/glyph/OCR data to compile a composite set of data from which decoding can reliably proceed.

To provide a comprehensive disclosure without unduly lengthening this specification, the above-detailed patents and applications (except U.S. Pat. No. 6,546,112 and application Ser. Nos. 09/198,022 and 08/512,993) are incorporated herein by reference.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. A method for checking an identity document comprising:
   (a) capturing a frame of image data corresponding to an identity document;
   (b) capturing another frame of image data corresponding to said identity document;
   (c) combining data from the captured frames, including less than the entirety of one of the captured frames, to yield a composite frame;
   (d) checking the composite frame to determine if it is suitable for decoding for information;
   (e) if so, decoding information from said composite frame; and
   (f) if not, repeating (b), (c), (d) and—if appropriate—(e);
   wherein part of one of said captured frames is not combined due to being out of focus.

2. A method for checking an identity document comprising:
   (a) capturing a frame of image data corresponding to an identity document;
   (b) capturing another frame of image data corresponding to said identity document;
   (c) combining data from the captured frames, including less than the entirety of one of the captured frames, to yield a composite frame;
   (d) checking the composite frame to determine if it is suitable for decoding for information;
   (e) if so, decoding information from said composite frame; and
   (f) if not, repeating (b), (c), (d) and—if appropriate—(e);
   wherein part of one of said captured frames is not combined due to having glare.

3. A method for checking an identity document comprising:
   (a) capturing a frame of image data corresponding to an identity document;
   (b) capturing another frame of image data corresponding to said identity document;
   (c) combining data from the captured frames to yield a composite frame;
   (d) checking the composite frame to determine if it is suitable for decoding for information;
   (e) if so, decoding information from said composite frame; and
   (f) if not, repeating (b), (c), (d) and—if appropriate—(e);
   wherein the method further includes decoding first and second machine readable data from said composite image frame, and checking said first and second data for expected correspondence, and wherein one of said machine readable data comprises digital watermark data.

4. A method for checking an identity document comprising:
   capturing plural frames of image data corresponding to an identity document;
   compositing a first portion of one of said frames with a different portion of another of said frames;
   decoding first and second machine readable data from said composition; and
   checking said first and second data for expected correspondence;
   wherein one of said machine readable data comprises digital watermark data.

5. A method for decoding a machine-readable identifier from image data, comprising:

at a first time, capturing a first frame of image data from a subject;

at a second, subsequent, time, capturing a second frame of image data from said subject;

identifying a region in the first frame that is relatively more reliable for decoding of said identifier than another region thereof;

identifying a region in the second frame that is relatively more reliable for decoding of said identifier than another region thereof;

combining image data from the reliable region in the first frame with image data from the reliable region in the second frame; and decoding a machine-readable identifier from said combined image data.

6. The method of claim 5 wherein the identifier comprises a steganographic watermark that includes unknown payload bits and known reference bits, and said identifying comprises checking regions in said first and second frames to determine if the known reference bits can be reliably decoded therefrom.

7. A method comprising the acts:

acquiring a first image of a subject at a first time;

acquiring a second image of the same subject at a second, later, time;

identifying a region in one of said first or second images suffering from glare;

identifying a corresponding region in the other of said first or second images, said corresponding region not suffering from glare;

assembling a composite image from said first and second images, wherein said identified region suffering from glare is omitted in the composite image, and the corresponding region not suffering from glare is included in the composite image;

wherein the composite image depicts a person's face, and the method further includes deriving information from the composite image to identify the person whose face is depicted.

8. The method of claim 7 in which the deriving comprises recognizing features in the composite image.

9. The method of claim 8 in which the deriving comprises recognizing OCR text in the composite image.

10. The method of claim 7 that further includes querying a database using said derived information, to obtain additional information relating to said person.

11. The method of claim 7 that further includes comparing said derived information against other information, obtained from a database record, to determine if the derived and obtained information match.

12. The method of claim 7 wherein said subject comprises an identification document.

13. A method comprising the acts:

acquiring a first image of a subject at a first time;

acquiring a second image of the same subject at a second, later, time;

identifying a region in one of said first or second images suffering from glare;

identifying a corresponding region in the other of said first or second images, said corresponding region not suffering from glare;

assembling a composite image from said first and second images, wherein said identified region suffering from glare is omitted in the composite image, and the corresponding region not suffering from glare is included in the composite image;

wherein said composite image comprises first data representing pixels depicting a person's face, and the method further includes applying an automated recognition process to said composite image to generate second data therefrom, and querying a database using said second data.

14. The method of claim 13 wherein said second data does not represent pixels.

15. The method of claim 13 wherein said automated recognition process comprises an optical character recognition process.

16. The method of claim 13 wherein said subject comprises an identification document.

* * * * *